(12) United States Patent
Mack (10) Patent No.: US 8,732,093 B2
(45) Date of Patent: May 20, 2014

(54) SYSTEMS AND METHODS FOR ENABLING DUTY DETERMINATION FOR A PLURALITY OF COMMINGLED INTERNATIONAL SHIPMENTS

(75) Inventor: Dennis P. Mack, Marietta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 292 days.

(21) Appl. No.: 13/014,332

(22) Filed: Jan. 26, 2011

(65) Prior Publication Data
US 2012/0191622 A1     Jul. 26, 2012

(51) Int. Cl.
G06Q 30/00     (2012.01)
G06Q 30/04     (2012.01)

(52) U.S. Cl.
CPC ........................... *G06Q 30/04* (2013.01)
USPC .......................................... 705/331

(58) Field of Classification Search
USPC ........................................ 705/33 X
See application file for complete search history.

(56) References Cited

U.S. PATENT DOCUMENTS

| | | |
|---|---|---|
| 3,353,845 A | 11/1967 | Curran |
| 4,128,204 A | 12/1978 | Wade |
| 4,167,476 A | 9/1979 | Jackson |
| 4,799,156 A | 1/1989 | Shavit et al. |
| 4,832,204 A | 5/1989 | Handy |
| 4,837,701 A | 6/1989 | Sansone |
| 5,008,827 A | 4/1991 | Sansone et al. |
| 5,051,914 A | 9/1991 | Sansone et al. |
| 5,063,506 A | 11/1991 | Brockwell |
| 5,068,797 A | 11/1991 | Sansone et al. |
| 5,161,109 A | 11/1992 | Keating et al. |
| 5,311,424 A | 5/1994 | Mukherjee et al. |
| 5,315,508 A | 5/1994 | Bain et al. |
| 5,375,240 A | 12/1994 | Grundy |
| 5,485,369 A | 1/1996 | Nicholls |

(Continued)

FOREIGN PATENT DOCUMENTS

| | | |
|---|---|---|
| CA | 2294038 | 12/1998 |
| CA | 2 424 649 | 9/2004 |

(Continued)

OTHER PUBLICATIONS

"Breaking News on Food & Beverage Developement—North America, DHL Launches a Virtual Warehouse for Importers;" Food USA Navigator.com, Jan. 5, 2006, two page article.

(Continued)

*Primary Examiner* — Brian Epstein
(74) *Attorney, Agent, or Firm* — Alston & Bird LLP (57) ABSTRACT

Various embodiments of the present invention provide systems, methods, and computer program products for enabling duty determination for each of a plurality of commingled international shipments being shipped to a plurality of consignees located in a country, the plurality of commingled international shipments being packed in an over packed carton. In general, various embodiments of the invention involve receiving information for each of the commingled international shipments that identifies the consignee for each of the commingled international shipments, creating an individual shipment identifier for each of the commingled international shipments, and associating each individual shipment identifier with the information for the corresponding commingled international shipment. Further, various embodiments of the invention involve transmitting the information for each commingled international shipment to a customs system to enable customs to consider each of the commingled international shipments separately for purposes of determining duty due for each of the commingled international shipments.

12 Claims, 4 Drawing Sheets

(56) References Cited

U.S. PATENT DOCUMENTS

| | | |
|---|---|---|
| 5,557,518 A | 9/1996 | Rosen |
| 5,631,827 A | 5/1997 | Nicholls et al. |
| 5,671,280 A | 9/1997 | Rosen |
| 5,694,551 A | 12/1997 | Doyle et al. |
| 5,712,789 A | 1/1998 | Radican |
| 5,717,989 A | 2/1998 | Tozzoli et al. |
| 5,721,832 A | 2/1998 | Westrope et al. |
| 5,724,424 A | 3/1998 | Gifford |
| 5,732,400 A | 3/1998 | Mandler et al. |
| 5,758,329 A | 5/1998 | Wojcik et al. |
| 5,770,841 A | 6/1998 | Moed et al. |
| 5,787,402 A | 7/1998 | Potter et al. |
| 5,794,207 A | 8/1998 | Walker et al. |
| 5,802,497 A | 9/1998 | Manasse |
| 5,843,864 A | 12/1998 | Popp et al. |
| 5,890,137 A | 3/1999 | Koreeda |
| 5,895,454 A | 4/1999 | Harrington |
| 5,897,621 A | 4/1999 | Boesch et al. |
| 5,909,492 A | 6/1999 | Payne et al. |
| 5,910,896 A | 6/1999 | Hahn-Carlson |
| 5,949,876 A | 9/1999 | Ginter et al. |
| 5,950,178 A | 9/1999 | Borgato |
| 5,960,408 A | 9/1999 | Martin et al. |
| 5,963,923 A | 10/1999 | Garber |
| 5,968,110 A | 10/1999 | Westrope et al. |
| 5,970,475 A | 10/1999 | Barnes et al. |
| 5,974,146 A | 10/1999 | Randle et al. |
| 5,995,950 A | 11/1999 | Barns-Slavin |
| 6,006,199 A | 12/1999 | Berlin et al. |
| 6,029,150 A | 2/2000 | Kravitz |
| 6,041,315 A | 3/2000 | Pollin |
| 6,047,264 A | 4/2000 | Fisher et al. |
| 6,049,785 A | 4/2000 | Gifford |
| 6,058,373 A | 5/2000 | Blinn |
| 6,061,607 A | 5/2000 | Bradley et al. |
| 6,064,994 A | 5/2000 | Kubatzki et al. |
| 6,067,532 A | 5/2000 | Gebb |
| 6,078,900 A | 6/2000 | Ettl et al. |
| 6,081,790 A | 6/2000 | Rosen |
| 6,108,639 A | 8/2000 | Walker et al. |
| 6,141,653 A | 10/2000 | Conklin et al. |
| 6,148,291 A | 11/2000 | Radican |
| 6,151,588 A | 11/2000 | Tozzoli et al. |
| 6,167,378 A | 12/2000 | Webber, Jr. |
| 6,167,385 A | 12/2000 | Hartley-Urquhart |
| 6,175,921 B1 | 1/2001 | Rosen |
| 6,178,409 B1 | 1/2001 | Weber et al. |
| 6,186,893 B1 | 2/2001 | Walker et al. |
| 6,199,051 B1 | 3/2001 | Gifford |
| 6,205,436 B1 | 3/2001 | Rosen |
| 6,205,437 B1 | 3/2001 | Gifford |
| 6,208,980 B1 | 3/2001 | Kara |
| 6,220,509 B1 | 4/2001 | Byford |
| 6,236,972 B1 | 5/2001 | Shkedy |
| 6,240,396 B1 | 5/2001 | Walker et al. |
| 6,249,774 B1 | 6/2001 | Roden et al. |
| 6,285,916 B1 | 9/2001 | Kadaba et al. |
| 6,289,260 B1 | 9/2001 | Bradley et al. |
| 6,289,323 B1 | 9/2001 | Gordon et al. |
| 6,343,275 B1 | 1/2002 | Wong |
| 6,356,196 B1 | 3/2002 | Wong et al. |
| 6,401,078 B1 | 6/2002 | Roberts et al. |
| 6,418,416 B1 | 7/2002 | Rosenberg et al. |
| 6,448,886 B2 | 9/2002 | Garber et al. |
| 6,460,020 B1 | 10/2002 | Pool et al. |
| 6,463,420 B1 | 10/2002 | Guidice et al. |
| 6,474,927 B1 | 11/2002 | McAdams et al. |
| 6,510,992 B2 | 1/2003 | Wells et al. |
| 6,529,797 B2 | 3/2003 | Williams et al. |
| 6,536,659 B1 | 3/2003 | Hauser et al. |
| 6,539,360 B1 | 3/2003 | Kadaba |
| 6,571,213 B1 | 5/2003 | Altendahl et al. |
| 6,610,955 B2 | 8/2003 | Lopez |
| 6,634,551 B2 | 10/2003 | Barta et al. |
| 6,648,153 B2 | 11/2003 | Holmes |
| 6,721,762 B1 | 4/2004 | Levine et al. |
| 6,722,506 B1 | 4/2004 | Nielsen et al. |
| 6,785,718 B2 | 8/2004 | Hancock et al. |
| 6,795,823 B1 | 9/2004 | Aklepi et al. |
| 6,808,114 B1 | 10/2004 | Palestini et al. |
| 6,845,364 B1 | 1/2005 | Pool et al. |
| 6,845,909 B2 | 1/2005 | Bong et al. |
| 6,866,195 B2 | 3/2005 | Knowles |
| 6,878,896 B2 | 4/2005 | Braginsky et al. |
| 6,913,202 B2 | 7/2005 | Tsikos et al. |
| 6,970,825 B1 | 11/2005 | Altendahl et al. |
| 6,974,928 B2 | 12/2005 | Bloom |
| 7,050,995 B2 | 5/2006 | Wojcik et al. |
| 7,272,571 B2 | 9/2007 | Tuttrup et al. |
| 7,355,505 B2 | 4/2008 | Bonner et al. |
| 7,366,770 B2 | 4/2008 | Hancock et al. |
| 7,426,484 B2 | 9/2008 | Joyce et al. |
| 7,426,514 B2 | 9/2008 | Dutta et al. |
| 7,596,500 B1 * | 9/2009 | Thompson et al. ............ 705/1.1 |
| 7,657,539 B2 | 2/2010 | Dutta et al. |
| 7,761,348 B2 | 7/2010 | Amling et al. |
| 7,870,999 B2 * | 1/2011 | Skaaksrud et al. ............ 235/384 |
| 8,065,237 B2 | 11/2011 | Bennett et al. |
| 2001/0018672 A1 | 8/2001 | Petters et al. |
| 2001/0027471 A1 | 10/2001 | Paulose et al. |
| 2001/0034673 A1 | 10/2001 | Yang et al. |
| 2001/0042055 A1 | 11/2001 | Didriksen et al. |
| 2002/0010634 A1 | 1/2002 | Roman et al. |
| 2002/0010661 A1 | 1/2002 | Waddington et al. |
| 2002/0010665 A1 | 1/2002 | Lefebvre et al. |
| 2002/0013744 A1 | 1/2002 | Tsunenari et al. |
| 2002/0016715 A1 | 2/2002 | Razumov |
| 2002/0016726 A1 | 2/2002 | Ross |
| 2002/0019759 A1 | 2/2002 | Arunapuram et al. |
| 2002/0019761 A1 | 2/2002 | Lidow |
| 2002/0032573 A1 | 3/2002 | Williams et al. |
| 2002/0032612 A1 | 3/2002 | Williams et al. |
| 2002/0038266 A1 | 3/2002 | Tuttrup et al. |
| 2002/0038267 A1 | 3/2002 | Can et al. |
| 2002/0042735 A1 | 4/2002 | Narahara et al. |
| 2002/0046130 A1 | 4/2002 | Monteleone |
| 2002/0059121 A1 | 5/2002 | Schneider et al. |
| 2002/0065738 A1 | 5/2002 | Riggs et al. |
| 2002/0069096 A1 | 6/2002 | Lindoerfer et al. |
| 2002/0070846 A1 | 6/2002 | Bastian, II et al. |
| 2002/0073039 A1 | 6/2002 | Ogg et al. |
| 2002/0077915 A1 | 6/2002 | Goto et al. |
| 2002/0082954 A1 | 6/2002 | Dunston |
| 2002/0091574 A1 * | 7/2002 | Lefebvre et al. ................ 705/19 |
| 2002/0095355 A1 | 7/2002 | Walker et al. |
| 2002/0099631 A1 | 7/2002 | Yanker et al. |
| 2002/0107744 A1 | 8/2002 | Rosenberg et al. |
| 2002/0107820 A1 | 8/2002 | Huxter |
| 2002/0116273 A1 * | 8/2002 | Sundel ........................... 705/19 |
| 2002/0116318 A1 | 8/2002 | Thomas et al. |
| 2002/0120561 A1 | 8/2002 | Chin et al. |
| 2002/0123944 A1 | 9/2002 | Williams et al. |
| 2002/0124389 A1 | 9/2002 | Matson |
| 2002/0128957 A1 | 9/2002 | Rosenberg et al. |
| 2002/0130065 A1 | 9/2002 | Bloom |
| 2002/0133415 A1 | 9/2002 | Zarovinsky |
| 2002/0152112 A1 | 10/2002 | Myers et al. |
| 2002/0152128 A1 | 10/2002 | Walch et al. |
| 2002/0153994 A1 | 10/2002 | Bonner et al. |
| 2002/0175606 A1 | 11/2002 | Holmes |
| 2002/0177922 A1 | 11/2002 | Bloom |
| 2002/0178074 A1 | 11/2002 | Bloom |
| 2002/0184119 A1 | 12/2002 | Gagne et al. |
| 2002/0198752 A1 | 12/2002 | Stiffler |
| 2003/0004735 A1 | 1/2003 | Dutta et al. |
| 2003/0009361 A1 | 1/2003 | Hancock et al. |
| 2003/0009396 A1 | 1/2003 | DeVries et al. |
| 2003/0023522 A1 | 1/2003 | Dutta et al. |
| 2003/0036982 A1 | 2/2003 | Tang et al. |
| 2003/0037009 A1 | 2/2003 | Tobin et al. |
| 2003/0040947 A1 | 2/2003 | Alie et al. |
| 2003/0041033 A1 | 2/2003 | Kaplan |
| 2003/0046220 A1 | 3/2003 | Kamiya |
| 2003/0061058 A1 | 3/2003 | Dutta et al. |

(56) References Cited

U.S. PATENT DOCUMENTS

| | | | |
|---|---|---|---|
| 2003/0069831 A1 | 4/2003 | Le et al. | |
| 2003/0078885 A1 | 4/2003 | Felton et al. | |
| 2003/0083964 A1 | 5/2003 | Horwitz et al. | |
| 2003/0097287 A1 | 5/2003 | Franz | |
| 2003/0115072 A1 | 6/2003 | Manucha et al. | |
| 2003/0144863 A1 | 7/2003 | Liu | |
| 2003/0154143 A1 | 8/2003 | Chen | |
| 2003/0167240 A1 | 9/2003 | Napier et al. | |
| 2003/0171948 A1* | 9/2003 | Thomas et al. | 705/1 |
| 2003/0191652 A1* | 10/2003 | Li et al. | 705/1 |
| 2003/0195784 A1 | 10/2003 | Smith, Jr. | |
| 2003/0195815 A1 | 10/2003 | Li et al. | |
| 2003/0212602 A1 | 11/2003 | Schaller | |
| 2003/0212631 A1 | 11/2003 | Foth et al. | |
| 2003/0236688 A1 | 12/2003 | Kadaba et al. | |
| 2004/0019569 A1 | 1/2004 | Lee et al. | |
| 2004/0088245 A1 | 5/2004 | Narayan et al. | |
| 2004/0098356 A1 | 5/2004 | Shabtai | |
| 2004/0107110 A1 | 6/2004 | Gottlieb et al. | |
| 2004/0128204 A1 | 7/2004 | Cihla et al. | |
| 2004/0153379 A1 | 8/2004 | Joyce et al. | |
| 2004/0215480 A1 | 10/2004 | Kadaba | |
| 2004/0215588 A1 | 10/2004 | Cornelius | |
| 2004/0243353 A1 | 12/2004 | Aghassipour | |
| 2005/0006470 A1 | 1/2005 | Mrozik | |
| 2005/0012154 A1 | 1/2005 | Herner et al. | |
| 2005/0060164 A1 | 3/2005 | Illion | |
| 2005/0149373 A1 | 7/2005 | Amling et al. | |
| 2005/0149453 A1 | 7/2005 | Amling et al. | |
| 2005/0154685 A1 | 7/2005 | Mundy et al. | |
| 2005/0222853 A1* | 10/2005 | Black et al. | 705/1 |
| 2005/0252596 A1* | 11/2005 | Olsen et al. | 156/64 |
| 2006/0015469 A1* | 1/2006 | Whitehouse | 705/410 |
| 2006/0036504 A1 | 2/2006 | Allocca et al. | |
| 2006/0053027 A1 | 3/2006 | Riggs et al. | |
| 2006/0085201 A1* | 4/2006 | Sultan | 705/1 |
| 2006/0108266 A1* | 5/2006 | Bowers et al. | 209/584 |
| 2006/0173700 A1 | 8/2006 | Fenelon | |
| 2006/0224426 A1 | 10/2006 | Goossens et al. | |
| 2006/0253339 A1 | 11/2006 | Singh et al. | |
| 2007/0244677 A1 | 10/2007 | Malitski et al. | |
| 2008/0114643 A1* | 5/2008 | Milovina-Meyer et al. | 705/14 |
| 2009/0089125 A1 | 4/2009 | Sultan | |
| 2009/0210243 A1 | 8/2009 | Pento et al. | |
| 2009/0254445 A1 | 10/2009 | Bennett et al. | |
| 2010/0185931 A1 | 7/2010 | Mayer et al. | |
| 2010/0223173 A1 | 9/2010 | Kadaba | |
| 2011/0066549 A1* | 3/2011 | Whitehouse | 705/39 |

FOREIGN PATENT DOCUMENTS

| | | |
|---|---|---|
| EP | 0 424 728 | 5/1991 |
| EP | 1 244 038 | 9/2002 |
| JP | 05-165847 | 7/1993 |
| JP | 07-282132 | 10/1995 |
| JP | 08-307545 | 11/1996 |
| JP | 11-504856 | 4/1997 |
| JP | 09-270073 | 10/1997 |
| JP | 10-091678 | 10/1998 |
| JP | 11-175621 | 7/1999 |
| JP | 11-296581 | 10/1999 |
| JP | 2000-011313 | 4/2000 |
| JP | 2000-113135 | 4/2000 |
| JP | 2001-220019 | 8/2001 |
| JP | 2002-002152 | 1/2002 |
| JP | 2002-041874 | 2/2002 |
| JP | 2002-211762 | 7/2002 |
| JP | 2002-240954 | 8/2002 |
| WO | WO 96/08783 | 3/1996 |
| WO | WO 97/11790 | 4/1997 |
| WO | WO 99/34272 | 7/1999 |
| WO | WO 00/00300 | 1/2000 |
| WO | WO 00/30014 | 5/2000 |
| WO | WO 00/46726 | 8/2000 |
| WO | WO 00/52555 | 9/2000 |
| WO | WO 01/16889 | 3/2001 |
| WO | WO 01/18712 | 3/2001 |
| WO | WO 01/29778 | 4/2001 |
| WO | WO 01/35344 | 5/2001 |
| WO | WO 01/65454 | 9/2001 |
| WO | WO 01/67344 | 9/2001 |
| WO | WO 01/72109 | 10/2001 |
| WO | WO 01/77848 | 10/2001 |
| WO | WO 01/88831 | 11/2001 |
| WO | WO 02/07021 | 1/2002 |
| WO | WO 02/07104 | 1/2002 |
| WO | WO 02/17045 | 2/2002 |
| WO | WO 02/052378 | 7/2002 |
| WO | WO 02/054172 | 7/2002 |
| WO | WO 02/101505 | 12/2002 |
| WO | WO 03/019333 | 3/2003 |
| WO | WO 03/069533 | 8/2003 |

OTHER PUBLICATIONS

"FedEx Improves Internal, External Operations" *Frontline Solutions*; Apr. 5, 2001(Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

"FedEx Insight Empowers Customers with Enhanced Shipment Visibility and Control," *El Portal Del Transporte*, Apr. 11, 2001 (Retrieved on Apr. 25, 2003), p. 9, Paragraph 4—p. 10, Line 7, Retrieved from the Internet: <URL: http://www.transportando.net/newsabril_completa.htm>.

"FedEx, UPS turn to Postal Service," *Memphis Business Journal*,1 page, available at http://memphis.bizjournals.com/memphis/stories/2003/11/03/daily33.html; dated Nov. 6, 2003; downloaded Nov. 11, 2003.

"Many Happy Returns—UPS Unveils Advanced Outline Returns Solution," *Journal*, Sep. 20, 2000; Dowloaded from the Internet on Oct. 3, 2002, Accession No. 12921102, Business Wire, United States of America.

Penny's Import Automation: J.C. Penney and Company, Inc. Uses Automated International Sourcing System; Chain Store Agee Executive With Shipping Center Age; Dec. 1994; pp.1, 5; vol. 70; No. 12.

"Process Demo—Pick-up, Induction, Scanning, Sortation, Bed Loading, Palletization, Staging and Delivery;" *Parcel Direct*; 9 pages, available at http://www.parceldirect.com/our_approach/process.asp; originated Aug. 4, 2002; downloaded Jun. 16, 2005.

"Technology;" *Parcel Direct*;1 page, available at http:///www.parceldirect.com/our_approcach/technology_more.asp; originated Aug. 12, 2002; downloaded Jul. 1, 2008.

"UPS Turns to Postal Service," *CNN Money*, 2 pages, available at http://www.cnnmoney.com; article dated Nov. 6, 2003; downloaded Nov. 11, 2003.

"UPS, FedEx turn to U.S. Post Office," *The Journal of Commerce Online*, 1 page, available at www.joc.com; dated Nov. 6, 2003; downloaded Nov. 11, 2003.

"UPS: US United Parcel Service Inc.," *Bloomberg*, 3 pages, available at www.bloomberg.com; dated Nov. 7, 2003, downloaded Nov. 11, 2003.

"Zone Skipping; *Parcel Direct*;" 2 pages found at http://www.parceldirect.com/our_approach/zone_skipping.asp (which dates back to Oct. 24, 2001) which were the search results from http://www.waybackmachine.org/.

Bradley;"National LTL Carriers: In for the Long Haul;" *Logistics Management and Distribution Report*; vol. 40, No. 6, pp. 37-40.

Brewin, et al.;"Follow That Package!", *Computer World*, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.

Brooks; "New UPS Delivery Service Sends Packages Through the Post Office;" *The Wall Street Journal*; 3 pages, dated Nov. 6, 2003.

Chudleigh, et al.; "Revenue Canada Helping Canadian Companies Save Time and Money, Electronic Commerce;"*CMA—The Management Accounting Magazine*; Jun. 1995; pp. 1-3; vol. 69; No. 5; Canada.

(56) References Cited

OTHER PUBLICATIONS

Cooke; "Pool Hauls: It May Not be New, but it's Definitely Hot;" *Logistics Management and Distribution Report*; vol. 41, No. 2, pp. 38-41.

De Marco; "E-Tail Presents Can Be Tougher to Send Back Than Order;" *Journal*; Dec. 28, 1999, Downloaded from the Internet on Oct. 3, 2002, Accession No. 08891512, Knight-Ridder/Tribune Business News, The Dialog Corporation, United States.

Delgaudio; "Keeping on Top of the Customers Regulations;" *Cygnus Interactive*; Copyright 2004.

Delia-Loyle; "Automated Services for International Trade: Directory;" *Global Trade*; Feb. 1992; pp. 1, 7-10; vol. 112: No. 2.

Diliger, "Strategic Moves," *Manufacturing Systems*, Feb. 1998, vol. 16, Issue 2, pp. 80-86. Retrieved Aug. 6, 2010.

Fed Express Spring Draft, brochure pages, Aug. 2003, 9 pages, BIA (Business Information & Analysis Competitive Analysis Group).

Feldman, "Documentation: The Tie That Binds," *Handling & Shipping Management*; pp. 1-4; vol. 25.

Grantham; "UPS Customers Can Get Upgraded Online Tracking of Packages," Newspaper, *The Commercial Appeal*, Jun. 23, 2999; Memphis, TN, Retrieved from the internet on Nov. 21, 2006 <http://proquest.umi.com/pqdweb?index=6&sid=5&srchmode=1&vinst=PROD&fmt=3&s>.

Harrington; "The U.S. Postal Service Gets Serious About Serving Business in the New Economy," *Journal*; May 2000, Downloaded from the Internet on October 3, 2002, p. 2, vol. 41, No. 5, Accession No. 01167257, Penton Publishing, Inc., United States of America.

Henderson; "Buy.com Boosts Returns Process Efficiency With New Solution," *Periodical*, Nov. 2000, Downloaded from the Internet on Oct. 3, 2002, pp. 72-76, vol. 82n11, Accession No. 02102731, ProQuest Info&Learning, United States of America.

Keeton; "Dow Jones, New Competitors to Challenge Shipping Industry Study," Article, Aug. 10, 2005.

Losciale; "French Post Office to Form Alliance;" *The Wall Street Journal*; Sep. 12, 2000. ProQuest document ID: 59893272, Europe, Brussels, Retrieved from the internet on Nov. 21, 2006, <http://proquest.umi.com/pqdweb?index=40&did=59893272&SrchMode=1&said=3&Fmt =>.

Meyers; "FedEx Services—Digitizing the Supply Chain for Maximum Impact," FedEx Confidential & Proprietary 2002; brochure—24 pages.

Connor; UPS, FedEx Turn to US Post Agency to Test Services; *Reuters*; 2 pages, dated Nov. 6, 2003.

Miller; "Over There Untangling the Complexities of Foreign Order Fulfillment," Four pages printed Jun. 2005.

Monguelluzzo; "Shipping Act Change Coming, But Only for UPS, FedEx?" *Journal of Commerce Online*; 2 pages, available at www.joc.com; dated Nov. 4, 2003.

Pender; "Hard Times Are the Best Times," *CIO* August 15, 2001 (Retrieved on Apr. 25, 2003), p. 3, Paragraph 3, Retrieved from the Internet: <URL:http://www.cio.com/archive/081501/besttimes_content.html>.

Robertson, et al.; Dynamic Routing and its Impact on Retail Suppliers, Transportation Cargo and Shipping, *Worldtrade*, Jun. 2003, vol. 16, No. 6, pp. 34-35.

Stank, et al.; "A Framework for Transportation Decision Making an Integrated Supply Chain;" *ABI/Inform Global*; 2000, vol. 5, Issue 2, p. 71, Retrieved Aug. 6, 2010.

Van Huzien; "Messaging: The Transport Part of the XML Puzzle," *Developer Works*, Jul. 2000 (Retrieved from the Internet Apr. 25, 2003: <URL:http://www-106.ibm.com/developerworks/library/xml-messageing/>.

Weber; "UPS to Test Service for Direct Marketers;" *Associated Press*; 2 pages, dated Nov. 6, 2003.

Witt; "Economic Strategies: Inventory Management, the Best Way to Manage Inventory is to Reduce it;" *Material Management Handling*, May 2003, vol. 58, No. 5, pp. 31-39.

International Search Report and Written Opinion of International Searching Authority dated December 19, 2011 for Application No. PCT/US2011/048345.

International Preliminary Examining Authority, International Preliminary Report on Patentability for International Application No. PCT/US2011/048345, mailed Apr. 1, 2013, 23 pages. United States Patent and Trademark Office, USA.

\* cited by examiner

SYSTEMS AND METHODS FOR ENABLING DUTY DETERMINATION FOR A PLURALITY OF COMMINGLED INTERNATIONAL SHIPMENTS

BACKGROUND

A duty is a type of tax that is often associated with customs, a payment due to the revenue of some type of entity such as a country or state, levied by force of law. In many instances, a duty is a kind of indirect tax on goods involved in international trade. As the World economy has grown, many merchants have customers located in a number of different countries. In particular instances, a merchant may receive several orders from a number of different recipients in a particular country. For example, a merchant located in France may sell men's clothing and may receive several Internet orders from customers living in the United States. In this instance, the merchant may take advantage of the cost of shipping one international shipment to the United States instead of many for the received orders and may package all the orders into one international shipment. Once the international shipment reaches its final destination country (e.g., the United States), the shipment is often received at an intermediary warehouse location where the individual orders are removed from the shipment and shipped to their final destinations within the country.

Often the international shipment must pass through customs upon arrival in the destination country in order to determine whether a duty is due on the articles in the shipment being imported into the country. In many instances, whether a duty is paid on an imported article is dependent on the value of the article. For example, in the United States, many international shipments valued under $200 are not subject to a duty and may be released under Section 321 of the U.S. Customs regulations with minimal requirements. However, in the case in which the merchant has packed all of the orders into one single international shipment that is addressed to one consignee (e.g., the intermediary warehouse) without any information on the individual orders inside the shipment and without customs physically inspecting the individual orders packed in the shipment, customs only considers the value of the entire shipment for purposes of determining the duty due on the international shipment. Therefore, if the value of all of the orders shipped in the shipment total more than $200, the shipment is subject to a duty.

Thus, a need exists in the art that allows for customs to consider each individual order in the single international shipment for purposes of determining whether a duty is due on each individual order without having to physically inspect each individual order in the shipment. Such a solution allows many of these orders to be exempt from being subject to a duty and, in many instances, helps to minimize the duty paid by the merchant and/or recipients.

BRIEF SUMMARY OF VARIOUS EMBODIMENTS OF THE INVENTION

Various embodiments of the invention include systems and methods for enabling duty determination for each of a plurality of commingled international shipments being shipped to a plurality of consignees located in a country in which the plurality of commingled international shipments are packed in an over packed carton. In various embodiments, the systems and methods are configured to receive information for each of the commingled international shipments. In particular embodiments, the information identifies the consignee for each of the commingled international shipments packed in the over packed carton.

Further, in various embodiments, the systems and methods are configured to create an individual shipment identifier for each of the commingled international shipments and to associate each individual shipment identifier with the information for the corresponding commingled international shipment. As a result, in particular embodiments, the information for each of the commingled international shipments is transmitted to a customs system. In various embodiments, this enables customs to consider each of the commingled international shipments separately for purposes of determining duty due for each of the commingled international shipments packed in the over packed carton.

In addition, after at least one of the plurality of commingled international shipments has cleared customs, various embodiments of the systems and methods are configured to delete the individual shipment identifier for the at least one of the plurality of commingled international shipments that has cleared customs and to create a domestic package identifier for the over packed carton identifying an intermediary location inside the country as a domestic consignee for the over packed carton. As a result, the over packed carton is shipped as a domestic shipment to the intermediary location inside the country so that the at least one of the plurality of commingled international shipments can be separated from the over packed carton after arrival at the intermediary location and shipped to the corresponding consignee in the country.

In various embodiments, the systems and methods are also configured to associate a tracking identifier for the over packed carton with the individual shipment identifiers to enable locating the over packed carton upon identifying a particular commingled international shipment by customs to examine so that the over packed carton may be opened and the particular commingled international shipment examined. In addition, in various embodiments, a label is provided on the over packed carton that is scanned at various locations during shipping of the over packed carton to provide tracking information for the plurality of commingled international shipments. Further, in various embodiments, the systems and methods are configured to receive the information on the plurality of commingled international shipments as a result of scanning a manifest provided along with the over packed carton. In particular embodiments, the manifest identifies each of the plurality of commingled international shipments packed in the over packed carton.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary Commingling Process

Various embodiments of the present invention enable duty determination for each of a plurality of commingled international shipments being shipped to a plurality of consignees located inside a country. In particular embodiments, the plurality of commingled international shipments are packaged in an over packed carton for shipment to the country (e.g., for importation into the country). The phrase "over packed carton" is employed in this disclosure to describe a single container used to hold a plurality of commingled shipments that is shipped as a single "shipment" to a country of import. For instance, in various embodiments, the over packed carton may be, for example, a package in which all of the shipments are packed, a cargo container for a ship, or a tractor trailer container driven across the border of two countries.

Figure 1:
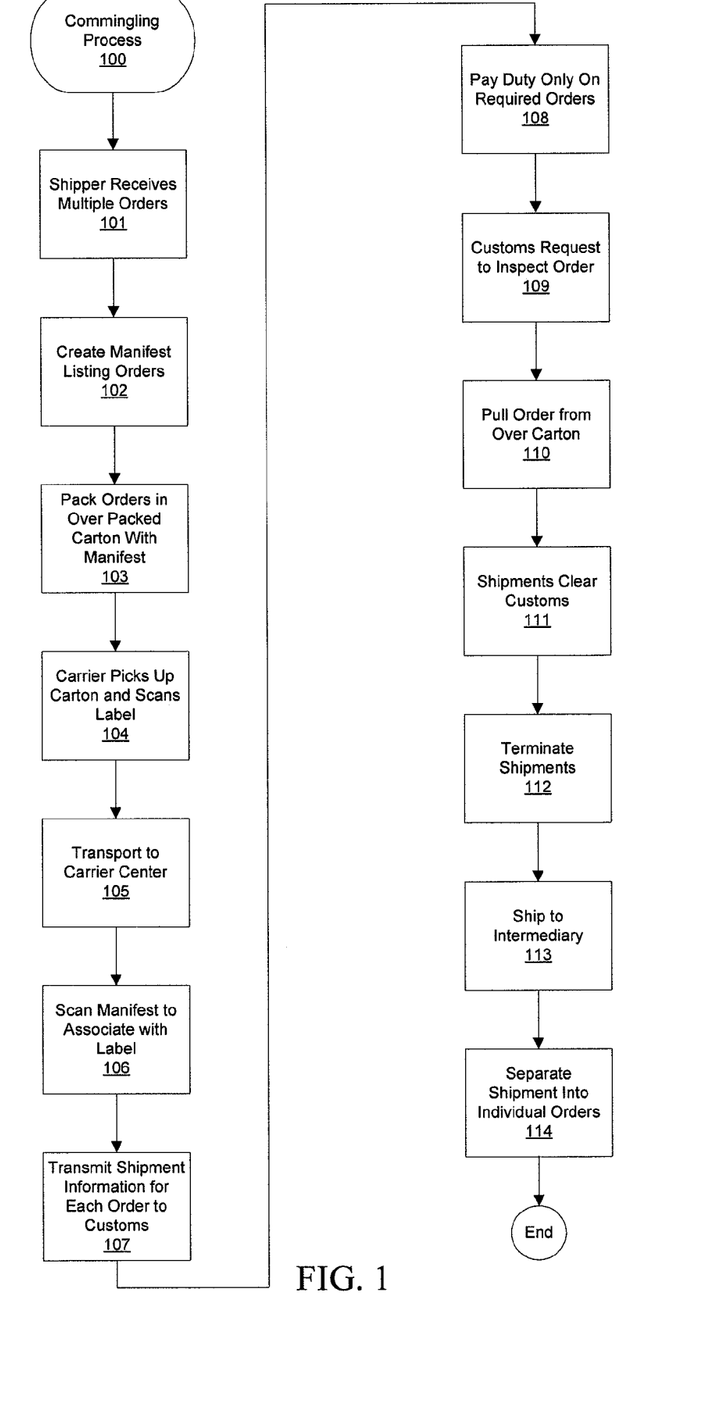
FIG. 1 shows a flow diagram for a commingling process according to one embodiment of the present invention.

FIG. 1 illustrates one embodiment of a process 100 for commingling a plurality of shipments being shipped to a plurality of consignees located inside a country so that each shipment may be considered separately by customs for purposes of calculating the amount of duty due on the shipments. For instance, a merchant located in France may have an ecommerce business in which the merchant sells women's and men's clothing on the Internet, and the merchant receives several orders for clothing from a plurality of customers located in the United States, shown as Step 101. In this particular case, the merchant decides to ship the multiple orders in a single international shipment. That is, the merchant decides to pack the multiple orders into one over packed carton and ship the carton as a single shipment to the United States with a common carrier. The over packed carton is to be shipped to an intermediary warehouse located in the United States, at which point the individual orders will be removed from the carton and shipped to their respective customers.

In Step 102, the merchant creates a manifest listing the multiple orders along with appropriate information about each order. For instance, in one embodiment, the merchant creates a manifest listing each order along with information for each respective order that include the items for the order (such as a man's shirt and slacks), the ultimate recipient/consignee of the order (e.g., the customer who placed the order), the recipient's/consignee's address, and the value of the order. In particular embodiments, the information may be provided on the manifest in a scannable format so that some type of scanning device may be used to read the information.

In Step 103, the merchant packs the multiple orders in an over packed carton along with the manifest. In particular embodiments, the merchant may also (or instead) include the manifest on the outside of the carton. For example, the merchant may print the manifest on some type of label that is applied to the outside of the over packed carton. In other embodiments, the merchant may also (or instead) transmit the manifest to the carrier. For example, the merchant may electronically transmit the manifest over the Internet or a closed network to the carrier's system.

In Step 104, the carrier picks up the over packed carton from the merchant and scans a shipping label placed on the carton. Depending on the embodiment, the label may be placed on the carton by the merchant or by an individual (e.g., a driver) from the carrier picking up the carton. As a result, the carton is entered into the carrier's system as an international shipment received from the merchant to be shipped to the intermediary warehouse in the United States.

The carrier transports the over packed carton to a distribution center, shown as Step 105. After arrival at the distribution center, the carrier removes the manifest from the carton (if required) and scans the manifest in order to associate the multiple orders packed in the carton with the shipping label on the carton, shown as Step 106. In various embodiments, this step involves the carrier's system creating an identifier for each order and storing the identifier along with an identifier for the shipping label in the carrier's system. In the particular embodiments in which the manifest is provided electronically to the carrier, the carrier's system may be configured to associate the manifest information with the shipping label instead of having to scan the information into the carrier's system. In other embodiments, the carrier may simply enter the information from the manifest manually into the carrier's system and manually associate the information for each order with the shipping label for the carton. As a result, this step creates an individual shipment for each order packed in the carton and an electronic link between each order and the carton itself within the carrier's system. Further, in particular embodiments, this step also includes transmitting the order information from the manifest for each order to the carrier's system.

In Step 107, the carrier transmits the shipment information for each individual order to customs. Thus, returning to the example, the carrier transmits the shipment information for each order included in the over packed carton to the United States Customs system. In various embodiments, the carrier may transmit the information electronically over a network such as the Internet or a closed network. In other embodiments, the carrier may provide customs with the information through various other mechanisms such as mailing a hardcopy of the information or emailing the information to customs.

As a result, United States Customs considers each order packed in the over packed carton as a separate shipment to a particular consignee in the United States. Therefore, United States Customs can evaluate each order separately as an individual international shipment with respect to whether a duty is owed on the order. Thus, in particular embodiments, United States Customs does not use the combined value of the orders packed into the over packed carton to determine whether a duty is due. Instead, United States Customs uses the value of each individual order to determine whether a duty is due on the order, and accordingly, in Step 108, the merchant (or the consignees) pays the duty only on the orders in which a duty is due. Thus, returning to the example, the merchant pays the duty only on the individual orders valued over $200. In many instances, this may result in the merchant (or the consignees) having to pay a much smaller amount of duty than if the values for the orders were combined and considered by United States Customs.

Another advantage realized in various embodiments is that individual orders can be easily identified from the over packed carton upon request by customs so that the order may be pulled from the carton and inspected. For instance, in Step 109, customs may identify a particular order packed in the over packed carton to be inspected. In this particular instance, the over packed carton may be easily identified at the customs facility by use of the order identifier associated with the shipping label on the carton. As previously mentioned, in various embodiments, each order has an identifier that is associated with the label on the carton. Thus, customs may identify a particular order for inspection and the carrier and/or customs may identify the particular over packed carton that holds the order based on the order's identifier and the label placed on the particular over packed carton. With this information, customs may then retrieve the particular over packed carton and pull the order from the carton, shown as Step 110.

In Step 111, once customs has determined the duty due on the multiple orders and has inspected the orders identified by customs for such, customs clears the individual shipments so that the shipments may enter the country. Thus, the carrier takes control of the over packed carton from customs for further shipment. In particular embodiments, the carrier terminates the individual shipments for each order in the carrier's system and creates a domestic shipment for the over packed carton to the intermediary warehouse in the United States, shown as Step 112. Therefore, in Step 113, the carton is shipped by the carrier to the intermediary warehouse. Once the carton arrives at the warehouse, warehouse personnel separate the carton into the individual orders, shown as Step 114. In particular embodiments, these orders may then be repackaged into individual shipments and shipped to the final recipient/consignee (e.g., the customer who placed the order).

III. Exemplary System Architecture

Figure 2:
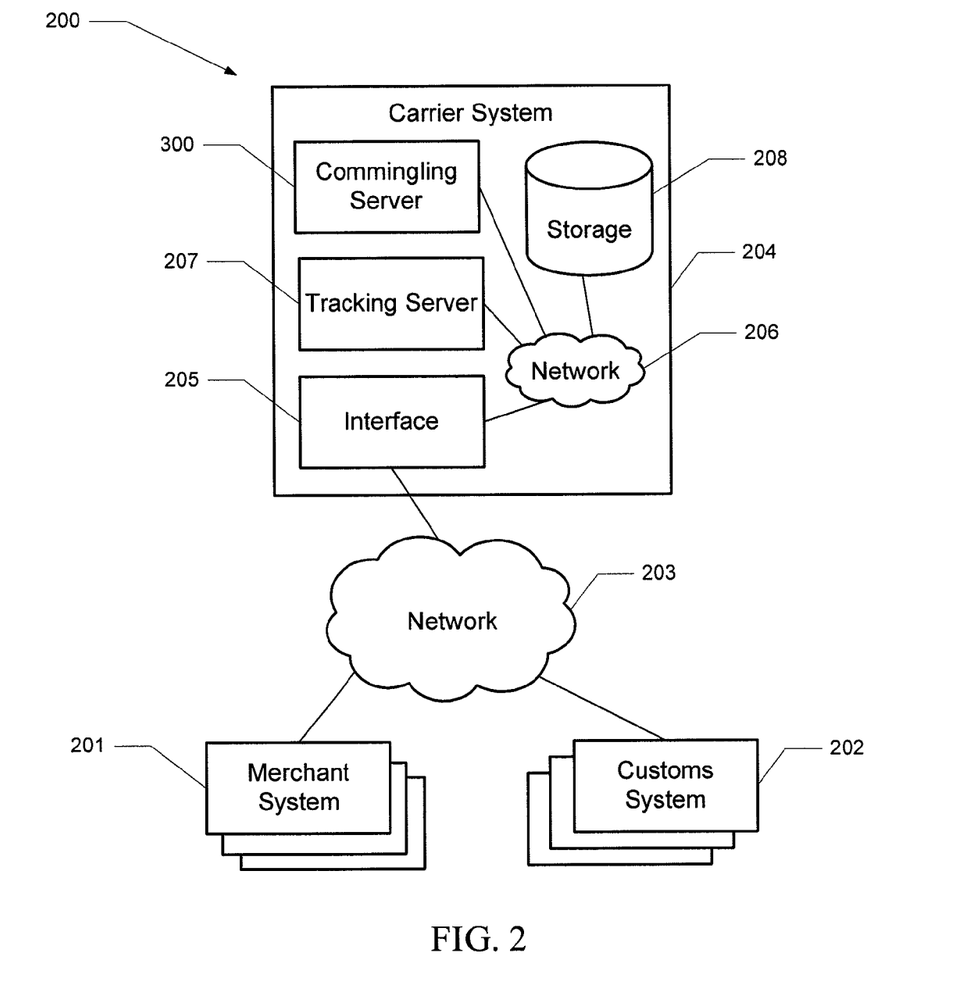
FIG. 2 shows an overview of one embodiment of an architecture that can be used to practice various aspects of the present invention.

FIG. 2 provides an illustration of a system architecture 200 that can be used in conjunction with various embodiments of the present invention. As shown in FIG. 2, the architecture 200 includes one or more systems 201, 202, 204 that are in electronic communication with one another, for example, over the same or different wireless or wired networks 203 including a wired or wireless Personal Area Network ("PAN"), Local Area Network ("LAN"), Metropolitan Area Network ("MAN"), Wide Area Network ("WAN"), the Internet, or the like.

The first of these systems is one or more merchant systems 201 that are associated with one or more merchants. For example, in various embodiments, one or more of the merchants may be involved in ecommerce and their corresponding systems 201 may be used to manage and provide ecommerce websites visited by a number of customers over the Internet. In addition, in various embodiments, one or more of the merchants' corresponding systems 201 may be used to manage and support various stores, warehouses, distribution centers, and other facilities used by the merchants. Further, in various embodiments, these systems 201 may include some type of interface to communicate with the network 203. The second of these systems is one or more customs systems 202 that are associated with customs for one or more entities such as, for example, countries, states, provinces, or regions. Similar to the merchant systems 201, in various embodiments, these systems 202 may also include some type of interface to communicate with the network 203.

Further, the third system is a carrier system 204 associated with a particular common carrier. As shown in FIG. 2, the carrier system 204 may be a collection of components that provide such services as an interface 205 to the network 203, a server 207 for tracking shipments being made by the carrier, and a server 300 providing capabilities associated with commingled international shipments. The collection of components may be in communication with one another, for example, over the same or different wireless or wired networks 206 within the carrier system 204, including a wired or wireless Personal Area Network ("PAN"), Local Area Network ("LAN"), Metropolitan Area Network ("MAN"), Wide Area Network ("WAN"), the Internet, or the like.

Further, the carrier system 204 may include one or more storage media 208. The storage media 208 may be in communication with one or more other components of the system such as the commingling server 300, the tracking server 207, and the interface 205. In various embodiments, the storage media 208 may be one or more types of media such as hard disks, magnetic tapes, or flash memory and may include one or more databases. The term "database" refers to a structured collection of records or data that is stored in a computer system, such as via a relational database, hierarchical database, or network database.

As described in greater detail below, in various embodiments, the commingling server 300 provides functionality to enable customs to determine the duty owed on each of a plurality of commingled international shipments being shipped in a single over packed carton to a plurality of consignees located in a country. For instance, in one embodiment, the commingling server 300 includes a commingling module 400 as described in greater detail below. Finally, while FIG. 2 illustrates the various systems of the architecture 200 and various components of systems as separate, standalone entities, the various embodiments are not limited to this particular architecture 200.

a. Commingling Server

Figure 3:
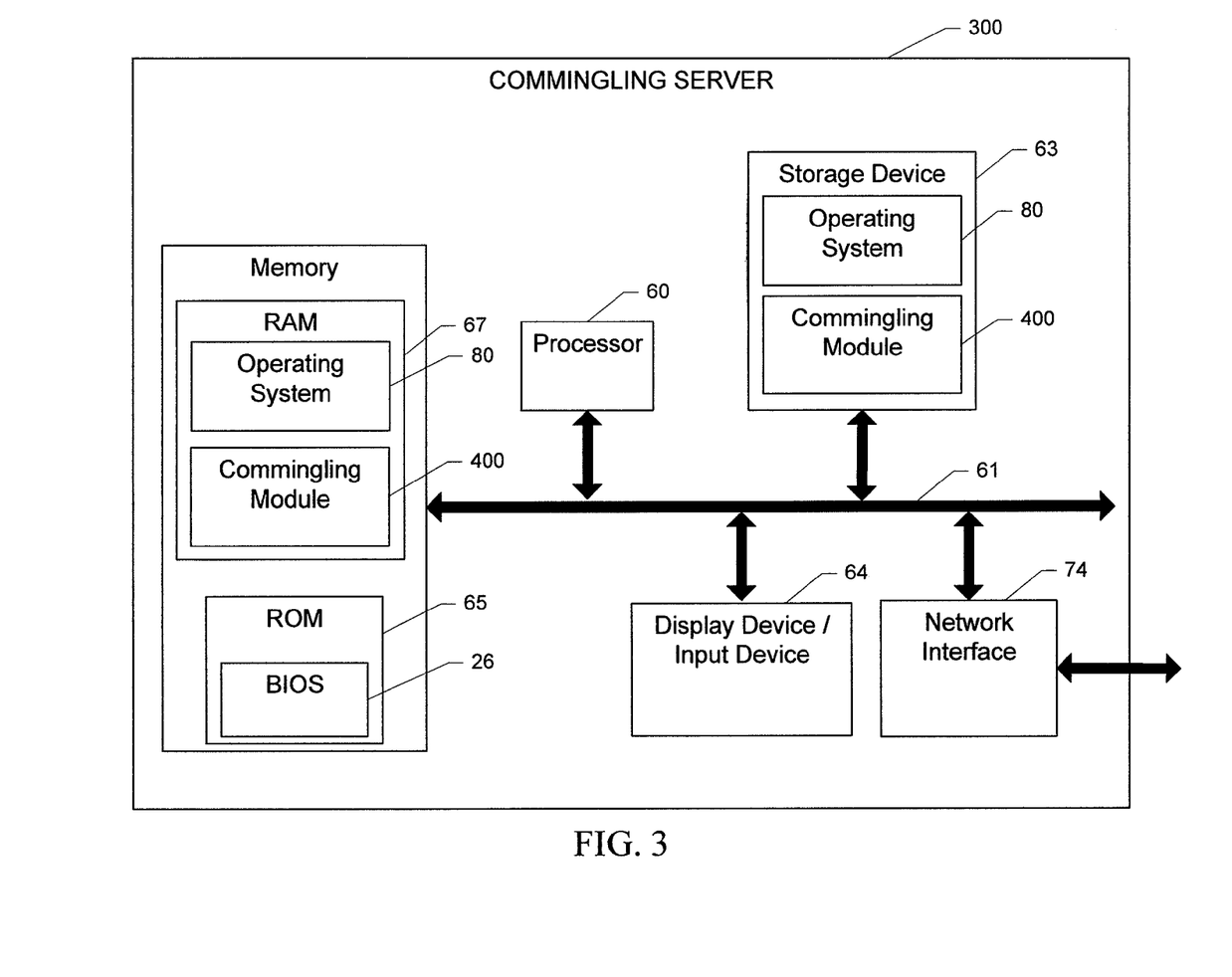
FIG. 3 shows an exemplary schematic diagram of a commingling server according to one embodiment of the present invention.

FIG. 3 provides a schematic of a commingling server 300 according to one embodiment of the present invention. The term "server" is used generically to refer to any computer, computing device, desktop, notebook or laptop, distributed system, server, gateway, switch, or other processing device adapted to perform the functions described herein. As will be understood from this figure, in this embodiment, the commingling server 300 includes a processor 60 that communicates with other elements within the commingling server 300 via a system interface or bus 61. The processor 60 may be embodied in a number of different ways. For example, the processor 60 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention while configured accordingly. A display device/input device 64 for receiving and displaying data is also included in the commingling server 300. This display device/input device 64 may be, for example, a keyboard or pointing device that is used in combination with a monitor. The commingling server 300 further includes memory 65, which may include both read only memory ("ROM") 66 and random access memory ("RAM") 67. The application server's ROM 66 may be used to store a basic input/output system ("BIOS") 26 containing the basic routines that help to transfer information to the different elements within the commingling server 300.

In addition, in one embodiment, the commingling server 300 includes at least one storage device 63, such as a hard disk drive, a CD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 63 may be connected to the system bus 61 by an appropriate interface.

Furthermore, a number of program modules (e.g., set of computer program instructions) may be stored by the various storage devices 63 and/or within RAM 67. Such program modules may include an operating system 80 and a commingling module 400. This module 400 may control certain aspects of the operation of the commingling server 300 with the assistance of the processor 60 and operating system 80, although the module's functionality need not be modularized.

Also located within the commingling server 300, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the commingling server 300 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the commingling server's 300 components may be located remotely from other commingling server 300 components, such as multiple commingling servers 300. Furthermore, one or more of the components may be combined and additional components performing functions described herein may be included in the commingling server 300.

b. Additional Exemplary System Components

In various embodiments, the merchant and customs systems 201, 202 may also include components and functionality similar to that of the commingling server 300. For example, in one embodiment, the systems 201, 202 include one or more entities that may include: (1) a processor that communicates with other elements via a system interface or bus; (2) a display device/input device; (3) memory including both ROM and RAM; (4) a storage device; and (5) a network interface. It should be understood that these architectures are provided for exemplary purposes only and are not limiting to the various embodiments. The term "computing device" is used generically to refer to any computer, computing device, desktop, notebook or laptop, distributed system, server, gateway, switch, or other processing device adapted to perform the functions described herein.

IV. Exemplary System Operation

Figure 4:
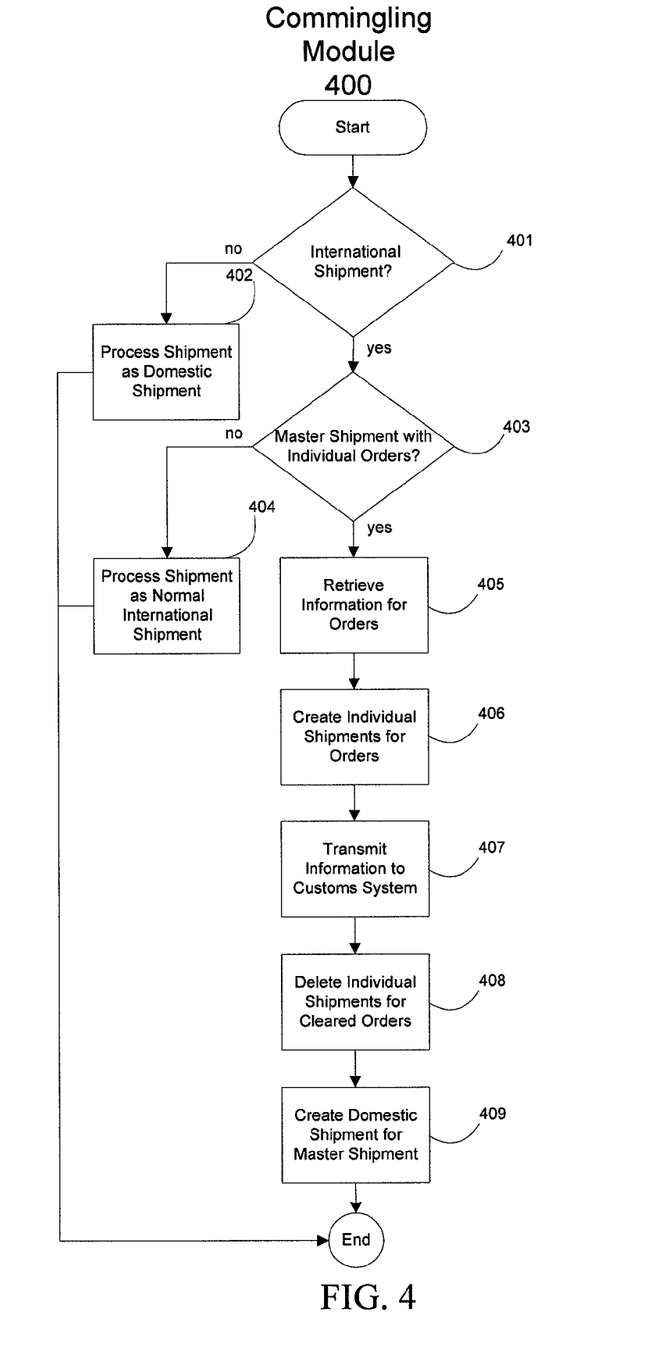
FIG. 4 shows a flow diagram of a commingling module according to one embodiment of the invention.

Reference will now be made to FIG. 4 which illustrates operations and processes as produced by various embodiments of the commingling module 400. This module 400 is described in greater detail below.

a. Commingling Module

As previously discussed, in various embodiments, the commingling server 300 may include a commingling module 400 that is configured to facilitate duty determination for each of a plurality of commingled international shipments being imported in a single over packed carton to a plurality of consignees located inside a country. FIG. 4 illustrates a flow diagram of the commingling module 400 according to various embodiments. This flow diagram may correspond to the steps carried out by the processor 60 in the commingling server 300 shown in FIG. 3 as it executes the module 400 in the server's RAM memory 67 according to various embodiments.

Starting at Step 401, the commingling module 400 receives information on a shipment being handled by the carrier and determines whether the shipment is an international shipment. For instance, in one embodiment, the carrier includes in the information for a shipment an indicator that the shipment is an international shipment. In another embodiment, the carrier processes international shipments via different systems, different program modules, and/or different storage media. Therefore, in this particular instance, the commingling module 400 determines whether the shipment is an international shipment based on the system, module, and/or storage media from which the information is received.

If the commingling module 400 determines the shipment is not an international shipment, the module 400 has the shipment processed as a domestic shipment, shown as Step 402. However, if the commingling module 400 determines the shipment is an international shipment, the module 400 determines whether the shipment represents a master shipment (e.g., an over packed carton) holding a plurality of individual orders, shown as Step 403. For example, a shipment to the United States may have been received from an electronics retailer located in Tokyo, Japan. At the time the carrier received the shipment from the electronics retailer, the retailer may have provided a manifest listing five different orders that have been packed in the shipment. Depending on the embodiment, the manifest may have been provided by the retailer using various mechanisms, such as including a hard copy of the manifest in the shipment, including the manifest on the outside of the shipment, and/or electronically transferring the manifest over a network 203 to the carrier system 204. In this particular instance, each order on the manifest identifies the items in the order and the final recipient (e.g., consignee) of the order in the United States. In turn, the manifest information is entered into the carrier system 204. For instance, in one embodiment, the manifest information is scanned from the manifest using a scanning device and is stored in one or more storage media 208 located within the carrier system 204.

Further, in various embodiments, the electronics retailer or the carrier may apply a shipping label to the outside of the shipment. This label may provide some type of identifier that is recorded in the carrier system 204 and identifies the particular shipment in the carrier system 204. For instance, in one embodiment, the identifier may be a tracking number assigned to the shipment and included on a shipping label placed on the shipment (e.g., on the outside of the over packed carton). It should be apparent to one of ordinary skill in the art in light of this disclosure that the identifier for the shipment need not be physically associated with the shipment. That is, in various embodiments, the identifier may only be electronically associated with the shipment in the carrier system 204. However, in particular embodiments, it may be advantageous to have the identifier physically associated with the shipment (e.g., printed on a label placed on the shipment) so that the shipment may be easily identified at various locations during the shipping and import processes.

In various embodiments, the shipment identifier is associated with the manifest information for each order packed in the shipment in the carrier system 204. Such an association may be accomplished in different ways according to various embodiments. For instance, in one embodiment, the carrier scans the information on the manifest and the shipping label placed on the over packed carton at the time the shipment is acquired from the retailer. In the previous example, a driver for the carrier arrives at the electronics retailer's shipping location in Tokyo and receives the shipment from the retailer. The over packed carton used for the shipment may have a manifest attached to the outside of the carton and a shipping label applied to the carton. Before loading the over packed carton into the driver's vehicle, the driver scans both the manifest and the shipping label using a handheld device and indicates using the device that the manifest information represents the orders packed in the carton. This information is then transmitted to the carrier system 204 and is stored in one or more storage media 208 located within the carrier system 204.

In another embodiment, the driver arrives at the electronics retailer's shipping location and receives the shipment from the retailer. However, in this instance, the manifest may have been placed inside the over packed carton. The driver scans the shipping label on the outside of the carton and transports the carton to a processing center for the carrier. After arrival at the center, personnel at the center open the over packed carton, scan the manifest, and indicate the scanned manifest information represents the orders packed in the carton. Again, this information is then transmitted to the carrier system 204 and is stored in one or more storage media 208 located within the carrier system 204.

Thus, returning to FIG. 4, the commingling module 400 in various embodiments determines whether the shipment received from the retailer is a master shipment with individual orders by detecting whether manifest information is associated with the shipment. For instance, in one embodiment, the commingling module 400 is configured to query the one or more storage media 208 for information that indicates the shipment has multiple orders packed in the shipment (e.g., indicates the shipment is a master shipment). If the commingling module 400 determines the shipment is not a master shipment, the commingling module 400 has the shipment process as a normal international shipment, shown as Step 404. However, if the commingling module 400 determines the shipment is a master shipment, the commingling module 400 retrieves the information for the individual orders packed in the master shipment (e.g., over packed carton) from the storage media 208, shown as Step 405.

Based on the retrieved information, in Step 406, the commingling module 400 creates individual shipments for each order packed in the master shipment. For instance, in various embodiments, the commingling module 400 assigns an identifier to each order packed in the master shipment and associates the identifiers with the corresponding manifest information and the master shipment (e.g., over packed carton) in the storage media 208. For example, in one embodiment, the commingling module 400 assigns an individual tracking number to each order packed in the master shipment and associates the tracking numbers for the orders to the tracking number for the master shipment (e.g., over packed carton). As a result, in various embodiments, the individual orders are treated as individual shipments as they travel through the carrier's shipping network to the destination country (.e.g., to the United States). Further, in various embodiments, the individual orders may be tracked while traveling through the carrier's shipping network. For instance, the shipping label on the over packed carton may be scanned at various locations during the shipping process and the scanned information may be associated with the individual orders in the carrier's system 204.

In Step 407, the commingling module 400 transmits information for the individual orders and master shipment to a system for customs in which the master shipment is to pass through upon arrival at the destination country. For instance, returning to the previous example, the commingling module 400 transmits information for the individual orders and master shipment from the carrier system 204 over a communication channel 203 to the United States Customs system. Various forms of information may be transmitted according to particular embodiments. For example, in various embodiments, the information may include the information gathered from the retailer's manifest identifying the items in each order and the value for each order along with the identifier for each order and the identifier for the master shipment. Further, in various embodiments, the information may also identify the final recipient/consignee of the order and/or the address of the recipient/consignee.

As a result, in various embodiments, customs is able to evaluate each order packed in the master shipment as an individual shipment for purposes of determining the duty due on the order without having to physically inspect the orders packed in the master shipment. Further, in various embodiments, customs is able to identify any orders of interest packed in the master shipment that they may wish to inspect. Thus, in these particular embodiments, after arrival of the master shipment (e.g., over packed carton) at the customs location, the master shipment may be identified and located and the orders identified for inspection may be pulled from the master shipment for inspection.

Once one or more of the orders in the master shipment have been properly processed through customs, customs may release the orders to the carrier. In various embodiments, upon notification that the orders have been released by customs, the carrier continues to ship the orders to an intermediary warehouse located in the country of import. For instance, returning to the example, customs releases all of the orders that have been packed in the master shipment except one, which has been removed by customs for inspection. The carrier receives the resealed master shipment (e.g., over packed carton) with the remaining orders packed inside and continues to ship the master shipment to an intermediary warehouse as identified by the electronic retailer that originally shipped the orders in the master shipment. In particular embodiments, this is accomplished by the commingling module 400 deleting the individual shipments for the released orders in the carrier system 204, shown as Step 408. For instance, in particular embodiments, the commingling module 400 may delete or mark the identifiers for the released orders stored in the storage media 208 as being invalid. Further, in various embodiments, the commingling module 400 may create a domestic shipment for the master shipment with the final recipient being the intermediary warehouse location, shown as Step 409. Thus, as a result, the master shipment is now considered a single domestic shipment within the carrier's shipping network and is delivered to the intermediary warehouse location.

After arrival at the intermediary location, the individual orders are separated from the master shipment so that they may then be shipped to the final recipients (e.g., the customers). Thus, in the previous example, each individual order for the electronics retailer is removed from the over packed carton and repackaged for shipment to the respective customer. At this point, in various embodiments, the repackaged order may be shipped with the same or a different carrier to the customer in the United States.

b. Additional Comments

It should be understood that the functionality of the commingling module 400 described above may be combined with other modules or separated into multiple modules in particular embodiments. Therefore, the description of the module 400 is provided above as the module 400 relates to the functionality performed by various embodiments of the invention and should not be construed to limit the scope of the claimed invention.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for enabling duty determination for each of a plurality of commingled international shipments being shipped to a plurality of consignees located in a country, the plurality of commingled international shipments being packed in an over packed carton, the system comprising:
   memory; and
   at least one computer processor configured to:
      receive information for each of the commingled international shipments, the information comprising consignee data and value data for each of the commingled international shipments;
      store the information in the memory;
      create an individual shipment identifier for each of the commingled international shipments;
      associate each individual shipment identifier with the information comprising the consignee data and the value data for the corresponding commingled international shipment;
      transmit each individual shipment identifier and the information comprising the consignee data and the value data for each of the commingled international shipments to a customs system to enable customs to individually determine, based at least in part on the value data for each of the commingled international shipments, a duty due for each of the commingled international shipments packed in the over packed carton; and
      after at least one of the plurality of commingled international shipments has cleared customs:
         delete the individual shipment identifier for the at least one of the plurality of commingled international shipments that has cleared customs; and
         create a domestic package identifier for the over packed carton identifying an intermediary location inside the country as a domestic consignee for the over packed carton, wherein the over packed carton is shipped as a domestic shipment to the intermediary location inside the country so that the at least one of the plurality of commingled international shipments can be separated from the over packed carton after arrival at the intermediary location and shipped to the corresponding consignee in the country.

2. The system of claim 1, wherein the at least one computer processor is configured to associate a tracking identifier for the over packed carton with the individual shipment identifiers in the memory to enable locating the over packed carton upon identifying a particular commingled international shipment by the customs to examine so that the over packed carton may be opened and the particular commingled international shipment examined.

3. The system of claim 1, wherein a label is provided on the over packed carton that is scanned at various locations during shipping of the over packed carton to provide tracking information for the plurality of commingled international shipments.

4. The system of claim 1, wherein the at least one computer processor receives the information on the plurality of commingled international shipments as a result of scanning a manifest provided along with the over packed carton, the manifest identifying each of the plurality of commingled international shipments packed in the over packed carton.

5. A method for enabling duty determination for each of a plurality of commingled international shipments being shipped to a plurality of consignees located in a country, the plurality of commingled international shipments being packed in an over packed carton, the method comprising the steps of:
- receiving information for each of the commingled international shipments, the information comprising consignee data and value data for each of the commingled international shipments;
- storing the information in one or more memory storage areas;
- creating, by at least one computer processor, an individual shipment identifier for each of the commingled international shipments;
- associating, by the at least one computer processor, each individual shipment identifier with the information comprising the consignee data and the value data for the corresponding commingled international shipment;
- transmitting, by the at least one computer processor, each individual shipment identifier and the information comprising the consignee data and the value data for each of the commingled international shipments to a customs system to enable customs to individually determine, based at least in part on the value data for each of the commingled international shipments, a duty due for each of the commingled international shipments packed in the over packed carton; and
- after at least one of the plurality of commingled international shipments has cleared customs:
  - deleting, by the at least one computer processor, the individual shipment identifier from the memory for the at least one of the plurality of commingled international shipments that has cleared customs; and
  - creating, by the at least one computer processor, a domestic package identifier for the over packed carton identifying an intermediary location inside the country as a domestic consignee for the over packed carton, wherein the over packed carton is shipped as a domestic shipment to the intermediary location inside the country so that the at least one of the plurality of commingled international shipments can be separated from the over packed carton after arrival at the intermediary location and shipped to the corresponding consignee in the country.

6. The method of claim 5 further comprising the step of associating a tracking identifier for the over packed carton with the individual shipment identifiers in the memory to enable locating the over packed carton upon identifying a particular commingled international shipment by the customs to examine so that the over packed carton may be opened and the particular commingled international shipment examined.

7. The method of claim 5 further comprising the steps of:
- providing a label on the over packed carton; and
- scanning the label at various locations during shipping of the over packed carton to provide tracking information for the plurality of commingled international shipments.

8. The method of claim 5, wherein the step of receiving the information on the plurality of commingled international shipments is performed by scanning a manifest provided along with the over packed carton, the manifest identifying each of the plurality of commingled international shipments packed in the over packed carton.

9. A non-transitory computer-readable medium containing executable code for enabling duty determination for each of a plurality of commingled international shipments being shipped to a plurality of consignees located in a country, the plurality of commingled international shipments being packed in an over packed carton, that when executed by at least one computer processor causes the at least one computer processor to:
- receive information for each of the commingled international shipments, the information comprising consignee data and value data for each of the commingled international shipments;
- store the information in memory;
- create an individual shipment identifier for each of the commingled international shipments;
- associate each individual shipment identifier with the information comprising the consignee data and the value data for the corresponding commingled international shipment;
- transmit each individual shipment identifier and the information comprising the consignee data and the value data for each of the commingled international shipments to a customs system to enable customs to individually determine, based at least in part on the value data for each of the commingled international shipments, a duty due for each of the commingled international shipments packed in the over packed carton; and
- after at least one of the plurality of commingled international shipments has cleared customs:
  - delete the individual shipment identifier for the at least one of the plurality of commingled international shipments that has cleared customs; and
  - create a domestic package identifier for the over packed carton identifying an intermediary location inside the country as a domestic consignee for the over packed carton, wherein the over packed carton is shipped as a domestic shipment to the intermediary location inside the country so that the at least one of the plurality of commingled international shipments can be separated from the over packed carton after arrival at the intermediary location and shipped to the corresponding consignee in the country.

10. The non-transitory computer-readable medium of claim 9, wherein the executable code, when executed by at least one computer processor, causes the at least one computer processor to associate a tracking identifier for the over packed carton with the individual shipment identifiers in the memory to enable locating the over packed carton upon identifying a particular commingled international shipment by the customs to examine so that the over packed carton may be opened and the particular commingled international shipment examined.

11. The non-transitory computer-readable medium of claim 9, wherein the executable code, when executed by at least one computer processor, causes the at least one computer processor to receive the information on the plurality of commingled international shipments as a result of scanning a manifest provided along with the over packed carton, the manifest identifying each of the plurality of commingled international shipments packed in the over packed carton.

12. A system for enabling duty determination for each of a plurality of commingled international shipments being shipped to a plurality of consignees located in a country, the plurality of commingled international shipments being packed in an over packed carton, the system comprising:

memory; and at least one computer processor configured to:

receive information for each of the commingled international shipments, the information comprising consignee data and value data for each of the commingled international shipments;

store the information in the memory;

create an individual shipment identifier for each of the commingled international shipments;

associate each individual shipment identifier with the information comprising the consignee data and the value data for the corresponding commingled international shipment;

transmit each individual shipment identifier and the information comprising the consignee data and the value data for each of the commingled international shipments to a customs system to enable customs to individually determine, based at least at least in part on the value data for each of the commingled international shipments, a duty due for each of the commingled international shipments packed in the over packed carton; and after at least one of the plurality of commingled international shipments has cleared customs, create a domestic package identifier for the over packed carton identifying an intermediary location inside the country as a domestic consignee for the over packed carton, wherein the over packed carton is shipped as a domestic shipment to the intermediary location inside the country so that the at least one of the plurality of commingled international shipments can be separated from the over packed carton after arrival at the intermediary location and shipped to the corresponding consignee in the country.

* * * * *